Jan. 1, 1963  M. M. SELBY  3,071,078
FLUID DISPLACEMENT MECHANISM
Filed Feb. 29, 1960  2 Sheets-Sheet 1
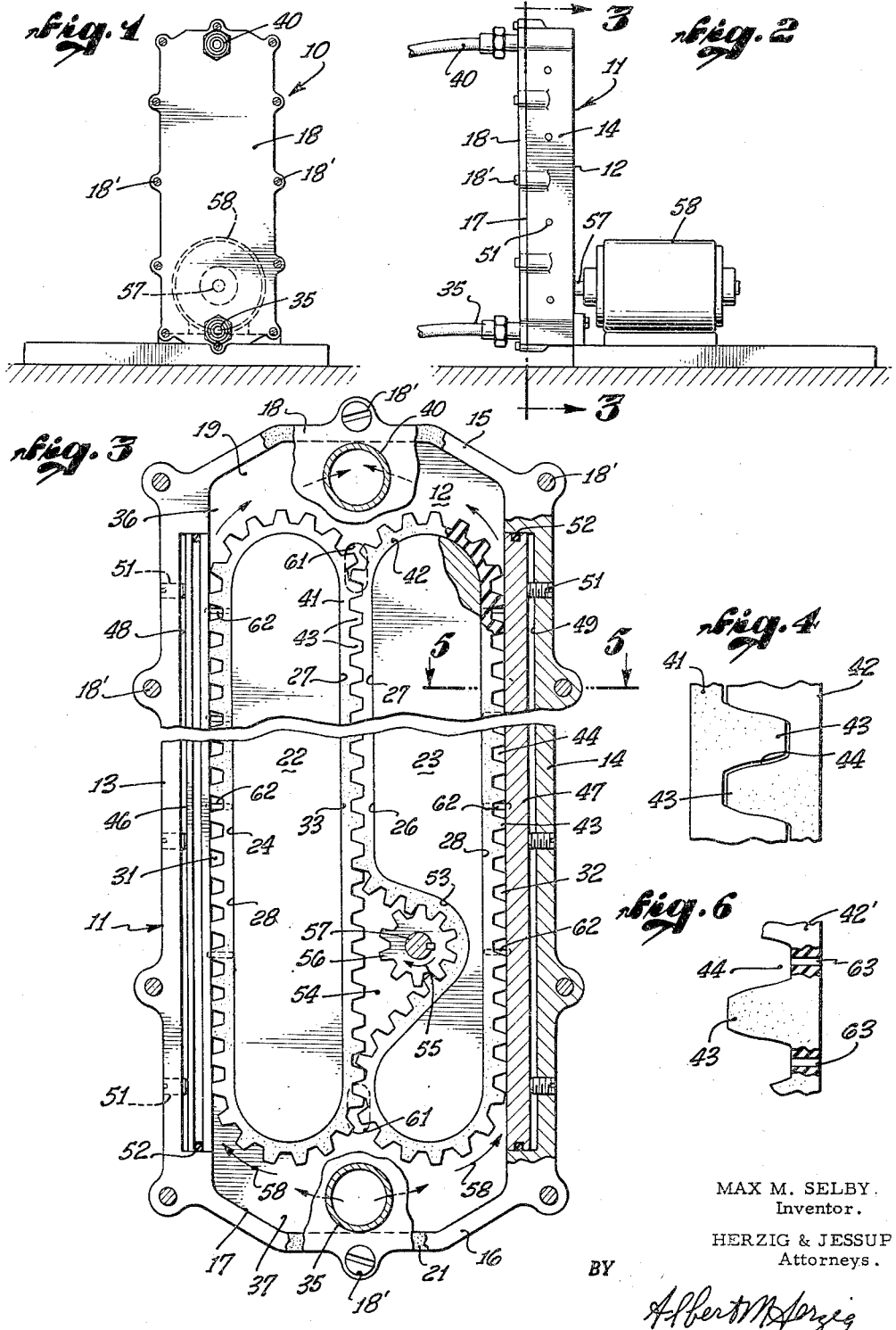
MAX M. SELBY,
Inventor.
HERZIG & JESSUP
Attorneys.

Jan. 1, 1963     M. M. SELBY     3,071,078
FLUID DISPLACEMENT MECHANISM
Filed Feb. 29, 1960     2 Sheets-Sheet 2
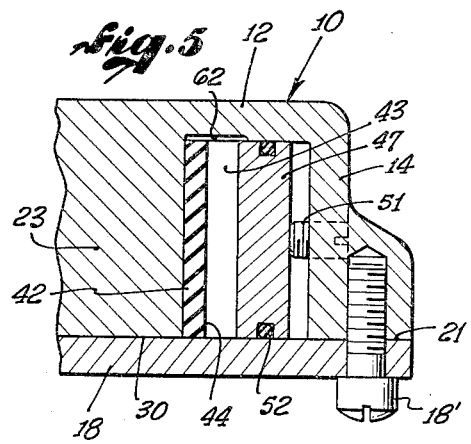
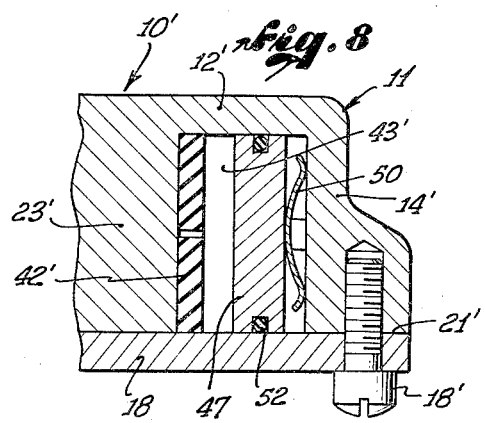
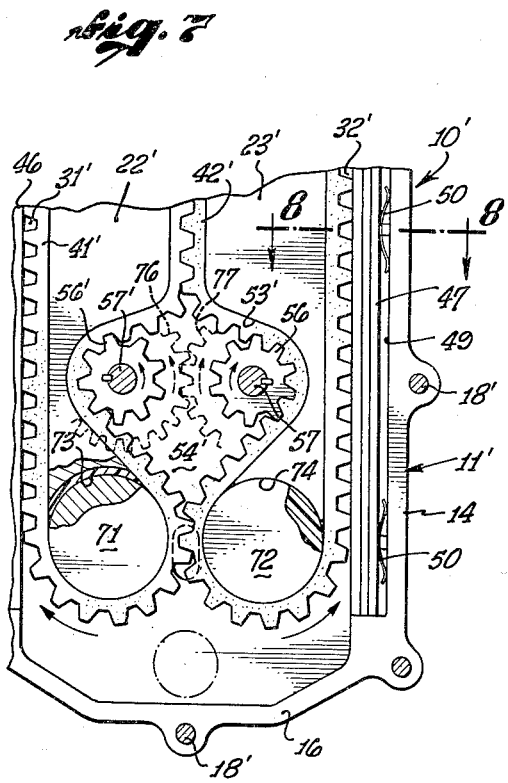
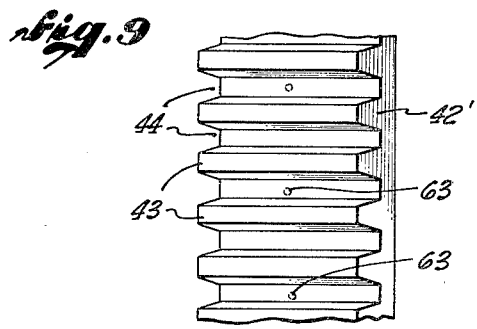
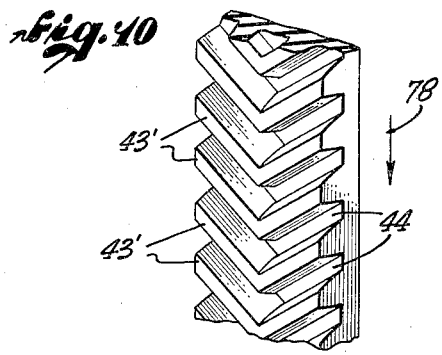
MAX M. SELBY,
Inventor.
HERZIG & JESSUP,
Attorneys.
BY Albert M Herzig

United States Patent Office 3,071,078
Patented Jan. 1, 1963

3,071,078
FLUID DISPLACEMENT MECHANISM
Max M. Selby, Los Angeles, Calif.
Filed Feb. 29, 1960, Ser. No. 11,825
25 Claims. (Cl. 103—126)

This invention relates to a fluid displacement mechanism and more particularly to a mechanism useful as a fluid pump or as a fluid motor of the gear type in which gear teeth of pliant, flexible driven belts are used to selectively displace fluid under pressure for use as a pump, or to drive a shaft for use as a motor.

Although in the past various gear-type fluid pumps and motors have been devised, none have been provided which are capable of operation with a high degree of efficiency, mainly due to the fact that rotating gears within a housing necessarily require an operational clearance for rotation of the gears relative to its housing. Such clearance results in a very low operational efficiency, due to the leakage of pressure from one discrete fluid chamber, defined by the spaces between the gear teeth, to adjacent such fluid chambers. Furthermore, pressures developed in the spaces between the teeth have caused rapid wear between moving parts, a disadvantage which has been attempted to be overcome by various complicated means of adjustment of the teeth relative to adjacent walls.

It is therefore an object of this invention to provide a gear-type fluid pump or motor which is adapted to pump gases, liquids, pastes or abrasive material and is usable as a hydraulic motor drivable by non-abrasive and lubricative fluids or gases under pressure.

Another object of this invention is to provide a new and improved fluid pump or motor in which wear of moving parts is substantially reduced.

Yet another object of this invention is to provide a new and improved fluid pump or motor which utilizes gear-toothed members of pliant, flexible material for appreciably quieter operation than possible in previous mechanisms of the gear type.

Still another object of this invention is to provide a pair of endless belts having unlimited sealing surfaces against each other and against rigid or adjustable pressure plates for providing unlimited conveyance of fluid in pressure-tight relationship.

A further object of this invention is to provide a new and improved fluid pump or motor of the character described in which teeth of one of the flexible belts are held enmeshed with teeth of the other flexible belt whereby only one of the belts need be driven, the movement of one of the belts being transmitted to the other of the belts, and in which both belts provide discrete, cooperative means for conveying the fluid.

A still further object of this invention is to provide a new and improved fluid pump or motor of the character described in which there is no relative movement of the fluid taking place during conveyance thereof.

Yet another object of this invention is to provide a new and improved fluid pump or motor of the gear-type which provides means for equalizing pressures between fluid pressure chambers, and the inner surface of the belt slidably mounted on its bearings to avoid binding of the belts on its bearing.

A still further object of this invention is to provide a new and improved fluid pump or motor in which pressure plates forming a wall for the fluid chambers are adjustable, or optionally self-adjusting, to compensate for wear and/or build up of pressures.

A general object of this invention is to provide a new and improved fluid pump or motor which overcomes disadvantages of prior means and methods heretofore employed to achieve generally similar purposes.

The instant invention provides a fluid-tight housing having inlet and outlet ports, a pair of pliant, flexible, endless belts having external teeth, the teeth of one of said belts being meshed with the teeth of the other belt for a portion thereof, for transmitting movement of one of the belts to the other, while the teeth of another portion of each belt forms, with side walls of the housing against which the portions slide, a plurality of discrete fluid chambers, between the teeth of the belt, a pair of spaced bearing islands within the housing for supporting the belt and defining passages, and drive means for driving one of the belts around the periphery of its bearing means, wherein incoming fluid at one end of the housing, the low pressure inlet end, is trapped within the discrete fluid chambers of the belt and conveyed to a high pressure end of the housing and discharged through the outlet port, each bearing means providing peripheral surfaces upon which the belts slide and forming means for retaining the belts in intermeshing engagement at portions thereof and in fluid-tight fluid chambers at opposed portions thereof for continual transmission of fluid from one end of the housing to the other.

By introducing fluid under pressure at one end of the housing, the belts are caused to drive a shaft for use as a fluid motor.

This invention further provides means for adjusting pressure plates incorporated within side walls of the housing and in sliding engagement with the fluid chambers which may be optionally self-adjusting to provide constant fluid-tight and pressure relief contact thereagainst.

These and other objects of this invention will be more apparent from the following detailed description, drawings, and appended claims.

In the drawings:

FIG. 1 is a front side view, in elevation, of a fluid displacement mechanism, designed and constructed in accordance with this invention;

FIG. 2 is a side view, in elevation, thereof;

FIG. 3 is an enlarged view, in elevation, thereof, with portions broken away for greater clarity;

FIG. 4 is an enlarged view illustrating a portion thereof in greater detail;

FIG. 5 is an enlarged cross-sectional view, as taken substantially along the line 5—5 of FIG. 3;

FIG. 6 is an enlarged fragmentary view, similar to FIG. 4, showing a modification thereof;

FIG. 7 is a view, similar to the lower portion of FIG. 3, illustrating a modification thereof;

FIG. 8 is an enlarged fragmentary cross-sectional view, as taken substantially along the line 8—8 of FIG. 7;

FIG. 9 is an enlarged perspective view, showing a belt means of the invention in greater detail; and FIG. 10 is an enlarged perspective view, illustrating a modification of the belt means.

Referring in detail to the drawings, and more particularly to FIGS. 1 through 5, inclusive, there is shown by way of illustration, but not of limitation, a fluid displacement mechanism generally designated by the numeral 10 and designed and constructed in accordance with this invention. The remaining figures disclose various modifications thereof, as examples, in which like parts thereof are referred to by like numbers, and distinguished by being primed.

The mechanism 10 comprises a housing 11 having a rear wall 12, opposing side walls 13 and 14, opposing end walls 15 and 16 and, for convenience of assembly and access, an open front 17 closed as by a removable front wall or cover 18. The cover 18 is secured to the housing 11 as by a plurality of peripherally spaced fasteners, in the form of bolts 18'. The housing defines an inner chamber 19 capable of holding a fluid under pressure, the cover 18 having a fluid-tight relationship to the housing 11 as by the provision of a sealing compound 21 applied to the face of the walls 13—16 during assembly thereof or of any other suitable sealing means.

A pair of spaced bearing members 22 and 23 are formed integrally with the back wall 12 of the housing, or optionally are secured thereto, each having a peripheral edge 24 and 26, respectively, portions of which are linear and ends of which are rounded. The linear portions are substantially parallel to each other, the linear faces of one bearing being substantially parallel to the linear faces of the other bearing. The inner linear faces 27 of each bearing member are transversely spaced from each other and adjacent to each other whereas the outer linear faces 28 are adjacent to the side walls 13 and 14 and spaced therefrom to form a fluid passage 31 between the side wall 13 and the bearing 22, a fluid passage 32 between the side wall 14 and the bearing 23 and a belt passage 33 between the bearing members 22 and 23.

The bearing members 22 and 23 extend entirely through the chamber 19 and are sealed at their upper faces 30 to the cover 18, similarly as at 21, to thereby effect end chambers 36 and 37 communicating with the passages 31, 32 and 33.

A pair of pliant, flexible, endless belts 41 and 42 provided in the housing, each being circumjacent one of the bearings 22 and 23, respectively, for sliding movement therearound. Each belt 41, 42 includes a plurality of spaced external gear teeth 43 defining spaces 44 therebetween. A portion of each belt 41, 42 passes through the passage 33, teeth 43 being intermeshed while in the passage 43. The inner peripheral surfaces 27 of the bearings 22, 23 are spaced so as to retain the teeth 43 in meshed engagement yet allowing sliding movement of the belts therebetween. Opposite portions of the belts 41, 42 are disposed within the passages 31 and 32 with the outer edges of the teeth 43 closely fitting the inner surface of the side walls 13 and 14 to thereby define discrete fluid chambers in the spaces 44 between the teeth 43 substantially the full length of the linear surfaces of the bearings 22 and 23, as best seen in FIG. 3.

The bolts 41, 42 are preferably the gear-toothed type of timing belt, comprised of a pliant, flexible material, such as rubber, neoprene, or the like, and reinforced as by a woven or stranded steel wire embedded therein.

To provide maximum efficiency, the side walls 13 and 14 include transversely movable pressure places 46 and 47, respectively, disposed in complementary-shaped recesses 48 and 49, respectively. A plurality of set screws 51 extend through the walls 13 and 14 for engagement with the pressure plates 46 and 47 whereby the plates may be adjusted relative to the belts 41 and 42 from the exterior of the housing. The pressure plates 46 and 47 are sealed as by O-rings 52.

One of the bearing members 22, 23, for example the bearing member 23 illustrated in FIG. 3, is relieved as at 53 to form a cavity 54 for separating a portion of the belt 42 from the belt 41. A spur gear 56 is disposed within the cavity 54 and intermeshed with the teeth 43 of the belt 42, the gear 56 being keyed to a driven shaft 57 of a drive means in the form of a motor 58, thereby to drive the belt 42 in one direction. As the belt 42 is driven by the gear 56, the belt 42 drives the belt 41 through the intermesh of the gear teeth of the two belts within the passage 33, the gear 56 being spaced so as to clear the teeth of the belt 41 to prevent interference therebetween.

In operation, fluid entering the cavity 19 through the inlet port 35, more specifically, into the low pressure chamber 37, is trapped between teeth 43 of each belt 41, 42 as the belts are progressed in sliding relationship to a respective pressure plate 46, 47.

Assuming that the gear 56 is being driven in the clockwise direction, indicated in FIG. 3 by the arrowed line 55, the belt 42 is driven by the gear 56 in a counter-clockwise direction to drive the belt 41 in a clockwise direction. The belts 41, 42 are thereby driven around the bearings 22 and 23 to draw fluid from the low pressure area, in the direction indicated by the arrowed lines 58, into the fluid chambers formed by the spaces 44, the teeth 43 and respective pressure plates 46, 47, and upwardly therealong, each cavity formed by the space 44 being charged with a fluid and the fluid being conveyed upwardly towards the high pressure cavity portion 36 and outwardly through the outlet port 40. The ports 35 and 40 are illustrated as being formed integrally with the front wall or cover 18; it is to be understood however, such ports may be formed in the walls 15 and 16, if desired.

As the fluid is conveyed to the high pressure area 36, it cannot be carried between the teeth 43 of the belts 41 and 42 in the area of the passage 33 as such teeth form a fluid-tight sealed relationship.

As best seen in FIG. 4, as the belt 42 is being driven downwardly at the central portion, its tooth 43 bears against a tooth 43 of the belt 41 thereby forming a fluid-tight seal at the contact surfaces thereof, and the multiplicity of teeth in the passage 33 forming a multiplicity of seals to keep fluid from entering therebetween. The fluid must then exit from the chamber 36 as through the outlet port 40. To avoid compression of the fluid and thereby jamming of the mechanism at the point where the belts 41 and 42 begin to engage, relief grooves, indicated at 61, are preferably provided at the point whereby the fluid may be squeezed outwardly from between the teeth. A similar groove 61 is preferably provided at the beginning of the tooth engagement adjacent to the low pressure chamber 37, whereby, upon reversal of the motor 58, wherein the direction of rotation of the gear 56 is reversed to a counter-clockwise direction to oppositely drive the belts 41 and 42, counter-clockwise and clockwise respectively, a relief is formed thereat to prevent a pressure build-up and provides a squeezing action to direct fluid towards the port 35 which, in that event, would be an outlet port.

To prevent binding of the belts 41 and 42 to their respective outer linear bearing surfaces as the fluid chambers are pressurized, transverse relief slots 62 are provided communicating between the fluid chambers (the spaces 44) and the inner surfaces of the belts whereby the pressure is equalized between the chambers and the inner surface of the belt.

To adjust the pressure of plates 46, 47 against their respective belt 41, 42, the set screws 51 may be manipulated from the exterior of the housing.

In reference to FIG. 6, a modified form of the belts is shown wherein each belt like 41, 42, and indicated at 42', is provided with a transverse passage 63 extending through the reduced portions of the belt, that is, in the area of the spaces 44 between the teeth 43, to transmit pressure from the fluid chamber (space 44) to the inner side of the belt to prevent binding of the belt 42' to the bearing adjacent thereto. In this manner, the transverse grooves 62 may be omitted.

The mechanism 10 may be easily adapted for use as a fluid motor, if desired. In use as a motor, a fluid under pressure is admitted through one of the ports 35, 40, for example, the inlet port 35. The fluid under pressure is sealed off at the contact point of the belts 41 and 42 where they are enmeshed and thereby acts upon the teeth 43 adjacent to the pressure plates in the direction of the arrowed lines 58 to move the belt 41 in a clockwise direction and the belt 42 in a counter-clockwise direction. Movement of the belt 42 is translated into a rotation of the gear 52, while the force of the movement of the belt 41 is transmitted to the belt 42 to assist the belt 42 in rotating the gear 56 to thereby cause the shaft 57 to rotate and define a fluid motor driven by the fluid under pressure. Fluid is discharged through the outlet opening 40 and recirculated through conduits and a pump (not shown) to re-enter the chamber 37 through the port 35.

Referring to FIGS. 7 and 8, another modification of this invention is illustrated, wherein the mechanism is referred to by the number 10'. The mechanism 10' includes, for the purpose of illustration, a housing 11' identical to that of the housing 11 of the previous embodiment, but including a pair of modified bearing members 22' and 23' to be hereinafter described.

At each end of each bearing 22', 23' cylindrical bearings 71 and 72 are provided and seated in arcuate bearing seats 73 and 74, respectively, to reduce friction of the belts at the rounded ends of the bearings. Two examples are shown in FIG. 7, wherein one bearing 72 is illustrated as being formed of a material having a high bearing capacity, such as nylon, Teflon, or the like, wherein friction is reduced in the rotation of the number 72 relative to its seat 74 and thereby reduces resistance to movement of the belt as it is moving around the ends to achieve greater efficiency. A material such as nylon or Teflon, or the like, also forms a good sealing surface between the rear wall 12 and the front wall or cover 18 and may be optionally used for forming the bearings 22, 23 or their counterparts 22' and 23'. As illustrated in relation to the member 71, the seat 73 itself may be formed of a high bearing capacity material such as a nylon, or Teflon strip, or the like, to reduce wear between a metallic member 71 and its seat and reducing noise appreciably.

Additionally in the instant embodiment, a further modification is illustrated, wherein each belt 41' and 42' is individually driven. For this purpose, a recess 53' is formed in the bearing 22' similar to the recess 53 previously described thereby providing an enlarged cavity 54' capable of accommodating a pair of gears, a gear 56 for driving the belt 42 and an additional gear 56' for driving the belt 41, the gears 56 and 56' being keyed, or otherwise secured, to shafts 57 and 57', respectively. The shafts 57 and 57' are simultaneously driven in opposite directions by intermeshed spur gears 76 and 77 keyed, or otherwise secured, to the shafts 57 and 57', respectively, and one of the shafts such as 57 being driven as by a motor to drive both gears 56 and 56'.

A further modification is illustrated in FIGS. 7 and 8, wherein the pressure plates 46 and 47 are biased inwardly into contact with the belts 41' and 42' passing through the passages 31' and 32', respectively, by resilient spring means in the form of leaf springs 50, or the equivalent. The pressure plates 46 and 47, in this instant embodiment, are self-adjusting to their respective belts and form relief valves capable of resiliently yielding if the pressure within the spaces 44 becomes excessive or if a foreign matter is caught between the outer faces of the teeth and the pressure plates.

FIG. 9 illustrates, in perspective, the belt 42' having apertures 63 extending therethrough, corresponding to the illustration of FIG. 6. FIG. 10 illustrates a modified formation of teeth 43' which are advantageously formed in a herringbone pattern to achieve a centralizing effect of the fluid trapped in the fluid chambers (spaces 44) and also to obtain a gradual squeeze when trapping and discharging fluid from the fluid chambers. The belts having teeth of the instant configuration are driven in the direction of the arrowed line 78, particularly in use with liquids having a high viscosity, or with pastes, so as to prevent scooping of the material which may overload and over-pressurize the spaces 44.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

What is claimed as new and desire to secure by Letters Patent is:

1. A fluid-displacement mechanism comprising: a housing capable of holding a fluid under pressure and having an inlet port and an outlet port; a pair of spaced bearing members, each having peripheral bearing surfaces, separating the interior of said housing so as to define a pair of spaced outer passages and a third passage intermediate to said outer passages, each said passages communicating with said inlet and outlet ports; a pliant, flexible, endless belt slidably disposed on the periphery of each of said bearing members and supported thereby over a substantial enough portion of its inner periphery to maintain said belt in its operative configuration, each being movable so as to continually position portions thereof in one of said outer passages and said intermediate passage and having external spaced teeth, the teeth of one belt being intermeshed with the teeth of the other of said belts when within the intermediate passage for transmitting movement of one of said belts to the other of said belts, and spaces between said teeth defining discrete, movable fluid chambers when within said outer passages for conveying fluid from said inlet port to said outlet port in response to movement of said belts; and drive means for driving at least one of said belts, the movement thereof being transmitted to the other of said belts for conveying fluid from said inlet port to said outlet port.

2. A mechanism, as defined in claim 1, wherein said passages are linear and substantially parallel to each other.

3. A mechanism, as defined in claim 2, wherein each said outer passage includes a movable pressure plate adjacent to and spaced from one of said bearing members and having sealing contact with its respective belt, said plate being adjustable so as to selectively adjust its position relative to its belt.

4. A mechanism, as defined in claim 2, wherein each said outer passage includes a movable pressure plate adjacent to and spaced from one of said bearing members and having sealing contact with its respective belt, said plate being self-adjustable, so as to automatically adjust its relative position to its belt.

5. A fluid displacement mechanism comprising: a housing capable of holding a fluid under pressure and including a rear wall and an opposing front wall, a pair of opposing side walls, a pair of opposing end walls, and having a port adjacent one of said end walls and another port adjacent the other of said end walls; a pair of bearing means in said housing, each having a periphery including outer surfaces parallel to and spaced from said side walls and inner surfaces adjacent to each other, the inner surfaces of one of said bearing means being substantially parallel to the inner surface of the other bearing means and spaced therefrom, each said bearing means having a fluid-tight relationship with said rear and front walls so as to define fluid passages between each said bearing means and its adjacent side wall and a third passage between said bearing means; a pair of pliant, flexible, endless belts, each slidingly disposed on the periphery of one of said bearing means for movement therearound, each of said belts being supported along substantially its entire inner periphery by the periphery of the bearing means on which it is disposed, said belt substantially traversing the space between said rear and front walls, each said belt having a portion thereof extending through one of said fluid passages and an opposite portion extending through said third passage, each belt having spaced external teeth, the teeth of one of said belts being intermeshed with the teeth of the other of said belts on the portion of said belts passing through said third passage and spaces between said teeth of said belts on the portions passing through said fluid passages defining discrete fluid chambers in said fluid passages; and drive means for driving one of said belts around the periphery of its bearing means, the movement of one of said belts being transmitted to the other of said belts by said engagement of said teeth in said third passage, and fluid from one of said ports being collected in said discrete fluid chambers and displaced into the other of said ports.

6. A mechanism, as defined in claim 5, wherein said drive means is reversible so as to drive said one belt in an opposite direction for reversing fluid displacement from said other port to said one port.

7. A mechanism, as defined in claim 5, wherein each of said side walls includes a pressure plate adjacent to said belts and in contact therewith and adjustable relative to said teeth of said belts so as to adjust clearance therebetween.

8. A mechanism, as defined in claim 5, wherein each of said side walls includes a spring-biased pressure plate adjacent to one of said belts and in contact therewith, said pressure plates being self-adjusting for contact with said belts.

9. A mechanism, as defined in claim 5, including means defining transverse passages in one of said front and back walls and communicating between said discrete fluid chamber and said outer periphery of said bearing means so as to transmit pressure from said discrete fluid chambers to the contact area of said belt with said bearing means for equalizing pressure therebetween to prevent binding of said belt means on said bearing means.

10. A mechanism, as defined in claim 5, including means defining transverse passages extending through portions of said belts between said teeth and communicating between said discrete fluid chambers and said outer peripheral surface of said bearing means so as to equalize pressure between said discrete fluid chambers and the inner surface of said belt for preventing binding of said belt with said bearing means.

11. A mechanism, as defined in claim 5, wherein the inner surfaces and the outer surfaces of each said bearing means are substantially parallel to each other and including rotatable cylindrical end members on each of said bearing means having an outer peripheral surface tangential to the inner and outer surfaces of said bearing means for friction-less movement of its belt therearound.

12. A mechanism, as defined in claim 11, wherein said rotatable end members are comprised of a friction-less material.

13. A fluid motor comprising: a housing capable of holding a fluid under pressure and including a rear wall and an opposing front wall, a pair of opposing side walls, a pair of opposing end walls, an inlet portion adjacent one of said end walls and an outlet port adjacent the other of said end walls; a pair of bearing members in said housing, each having a periphery including outer surfaces parallel to and spaced from said side walls and inner surfaces adjacent to each other, the inner surfaces of one of said bearing means being substantially parallel to the inner surface of the other of said bearing means and spaced therefrom, each of said bearing means having a fluid-tight relationship with said rear and front walls so as to define fluid passages between each said bearing means and its adjacent side wall and a third passage between said bearing means; a pair of pliant, flexible, endless belts, one on the periphery of each of said bearing means for movement therearound, each of said belts being supported along substantially its entire inner periphery by the periphery of the bearing means on which it is disposed, said belt being wide enough to provide a close sealing fit with said opposed rear and front walls of the housing, each belt having external teeth, the teeth of one of said belts being intermeshed with the teeth of the other of said belts on portions of the belts passing through said passage between said bearing means, and spaces between teeth of portions of said belts passing through said fluid passages defining discrete, movable fluid chambers in said fluid passages; gear means in said housing and secured to a shaft rotatably supported in said housing extending outwardly of said housing, said gear means being in engagement with one of said belts and being rotated by said belt in response to movement of said belt responsive to fluid pressure admitted at the inlet port wherein said belts are driven by said fluid pressure.

14. A fluid motor, as defined in claim 13, wherein the direction of rotation of said gear and thereby said shaft is reversible when fluid pressure is admitted to the other of said ports.

15. A fluid motor, as defined in claim 13, wherein each of said side walls includes a pressure plate adjacent to each of said belts and adjustable relative to said teeth of said belt so as to adjust contact of said plates with said teeth.

16. A fluid motor, as defined in claim 13, wherein each of said side walls includes a spring-biased pressure plate adjacent to one of said belts, each said pressure plate being self-adjusting for constant contact with its respective said belt.

17. A fluid motor, as defined in claim 13, wherein the inner surfaces and the outer surfaces of each of said bearing means are substantially parallel to each other and including rotatable end members on each of said bearing means, each of said members having an outer peripheral surface tangential in relation to said inner and outer surfaces of said bearing means for friction-less movement of its belt therearound.

18. A fluid motor, as defined in claim 17, wherein said rotatable end members are comprised of a friction-less material.

19. In a fluid pump of the rotary type having a housing and intake and discharge chambers therein, a plurality of belts having toothed outer surfaces, fluid channels in the housing providing communication between the said intake and discharge chambers, the said belts having reaches thereof arranged for movement in the said channels and having other reaches having the teeth thereof in intermeshing relationship, the improvements comprising spaced bearing members in the housing each having peripheral bearing surfaces on which one of said belts is slideably disposed, each of said bearing surfaces providing support for said associated belt along substantially its entire inner periphery so as to maintain said belt in its operative configuration.

20. A fluid pump as in claim 19 wherein the peripheral bearing surfaces of the said bearing members are stationary and conform contiguously to the interior surfaces of the respective belts.

21. A fluid pump as in claim 19 wherein end parts of the said bearing members are in the form of rotors rotatable with the belts, the fixed parts of the bearing members having surfaces lying along a tangent to the rotors.

22. A fluid pump as in claim 19 including means for driving at least one of said belts.

23. In a fluid pump of the rotary type having a housing and an intake and discharge chamber, means providing at least one fluid channel communicating between the said intake and discharge chambers, means comprising at least one endless belt having a toothed surface arranged to be moved along said fluid channel, means for driving said belt, and the improvement comprising an adjustable pressure plate having sealing contact with the said teeth of the belt and forming a side of the channel through which the belt moves.

24. A fluid pump as in claim 23 including means comprising a bearing member having a peripheral bearing surface with the belt slideably disposed on the peripheral bearing surface.

25. A fluid pump as in claim 24 wherein the end parts of the said bearing member are formed as rotors rotatable with the belt, the fixed part of the bearing member have surfaces lying along tangents to the said rotors.

References Cited in the file of this patent

UNITED STATES PATENTS

| | | | |
|---|---|---|---|
| 37,015 | Sweet et al. | Nov. 25, | 1862 |
| 81,778 | Hardy | Sept. 1, | 1868 |
| 89,268 | Andrew | Apr. 27, | 1869 |
| 164,147 | Conver | June 8, | 1875 |
| 367,374 | Deming | Aug. 2, | 1887 |
| 1,437,898 | Laforest | Dec. 5, | 1922 |
| 1,478,417 | Wottring et al. | Dec. 25, | 1923 |
| 2,467,641 | West | Apr. 19, | 1949 |
| 2,564,599 | Hapman | Aug. 14, | 1951 |
| 2,586,537 | Hapman | Feb. 19, | 1952 |
| 2,697,987 | Barclay | Dec. 28, | 1954 |
| 2,745,355 | Mosbacher | May 15, | 1956 |
| 2,837,031 | Ilune | June 3, | 1958 |